United States Patent [19]

Keesling, Jr.

[11] Patent Number: 4,744,112

[45] Date of Patent: May 17, 1988

[54] COLLAPSIBLE SOLAR-HEATED HOT TUB

[76] Inventor: Wiley E. Keesling, Jr., 524 Bradley St., Santa Paula, Calif. 93030

[21] Appl. No.: 898,455

[22] Filed: Aug. 20, 1986

[51] Int. Cl.$^4$ ............................................. A47K 3/06
[52] U.S. Cl. .......................................... 4/585; 4/588; 4/543; 4/493; 4/580
[58] Field of Search .................... 4/545, 542, 585, 588, 4/493, 498, 541, 559, 580, 543; 126/415, 416

[56] References Cited

U.S. PATENT DOCUMENTS

| | | | |
|---|---|---|---|
| 2,504,646 | 4/1950 | Burrow et al. | 4/585 |
| 2,689,812 | 9/1954 | Mollica et al. | 154/85 |
| 2,718,014 | 9/1955 | Mizrach et al. | 4/177 |
| 3,092,101 | 6/1963 | Kinney | 4/541 |
| 3,119,122 | 1/1964 | Weisbeck | 4/580 |
| 3,240,208 | 3/1966 | Everston | 4/559 |
| 3,363,268 | 1/1968 | Friedlander | 4/172 |
| 3,835,482 | 9/1974 | Tersch | 4/177 |
| 3,969,776 | 7/1976 | Gildea | 4/172 |
| 3,997,927 | 12/1976 | Culligan | 5/344 |
| 4,195,622 | 4/1980 | Dolza et al. | 4/493 |
| 4,312,084 | 1/1982 | Browning | 4/538 |
| 4,535,490 | 8/1985 | Wright | 4/585 |
| 4,546,505 | 10/1985 | Wakenshaw | 4/542 |

*Primary Examiner*—Henry J. Recla
*Assistant Examiner*—Linda J. Sholl
*Attorney, Agent, or Firm*—Milton S. Gerstein

[57] ABSTRACT

A collapsible, gas-inflatable hot tub which is for use in locations where hot water is not accessible or where hot baths are not available. The water of the hot tub is solar heated by making the walls of the water-holding receptacle black, and by providing an insulating cover for the water-holding receptacle that keeps the heat in until a bath is taken. The bottom of the receptacle is connected to a perforated hose for supplying forced air to the bottom of the receptacle in order to form air bubbles. The hot tub is reinforced by transverse ribs at the bottom.

7 Claims, 2 Drawing Sheets

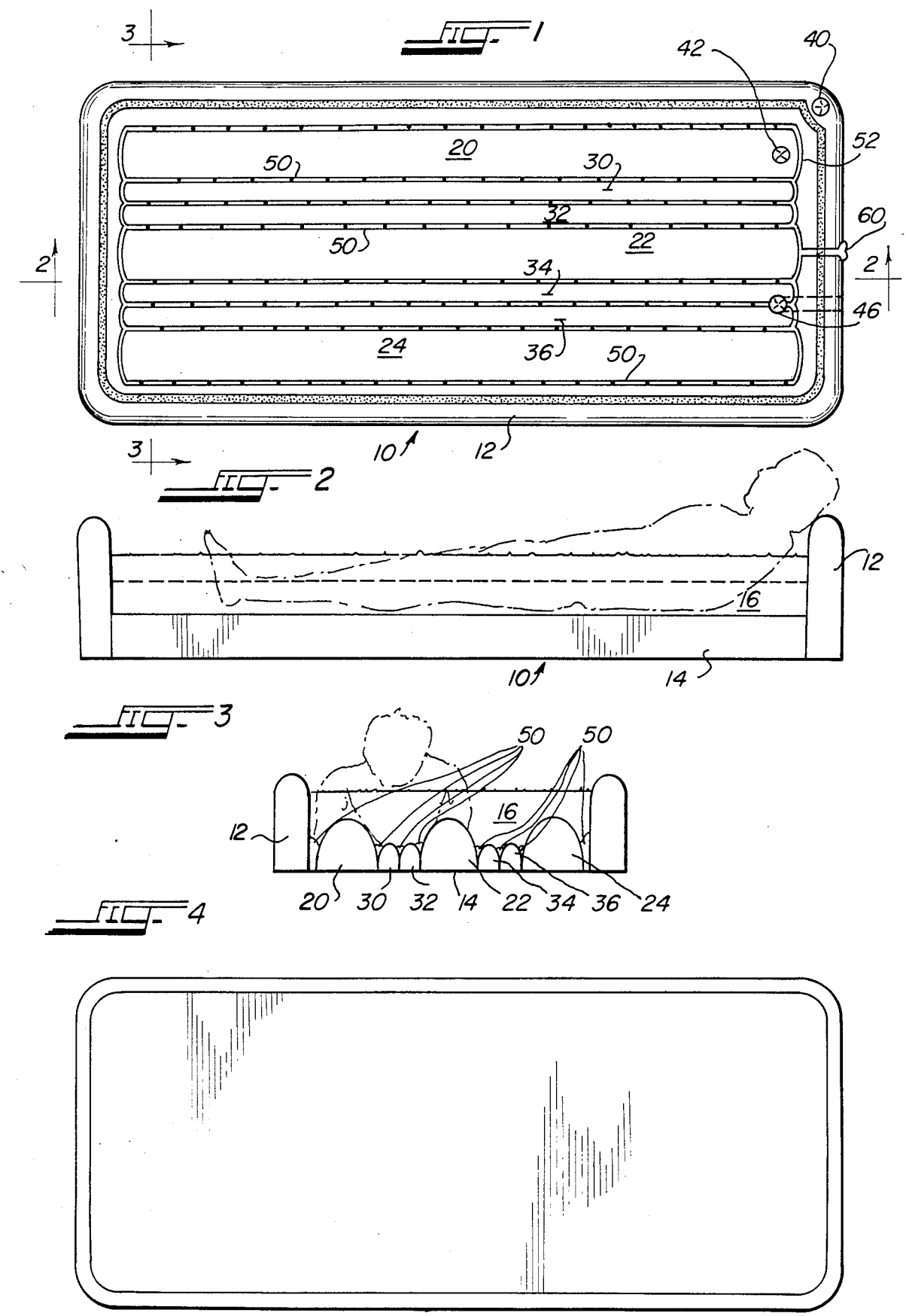

COLLAPSIBLE SOLAR-HEATED HOT TUB

BACKGROUND OF THE INVENTION

The present invention is directed to a collapsible hot tub that is solar-heated for use at camp sites, in the desert, wilderness, or in any remote location where it is not possible to obtain a hot bath. It has hithertofore, been a problem for campers, hikers, hunters, wildernesenthusiasts, and the like, to obtain a hot bath since access to a tub and/or hot water is not possible, owing to the remote location of the site. Persons may go many days without a bath, or have to travel considerable distance in order to reach bath or shower facilities.

U.S. Pat. No. 4,535,490 discloses a hot-water bath tub that is collapsible, but is not heated by solar energy. The tub of this patent is used in a stationary manner and is not meant to be portable or transported, and must be used in combination with fixed plumbing in the home, or the like, from which the how water for the tub is be obtained. The tub of this patent could not be used in remote wilderness areas, and the like, since there is no way for the tub to receive the hot water, and is also prohibitively heavy to carry and fill up with water owing to its size, which heaviness is, at least in part, due to the requirements for its fixed connection with house plumbing.

SUMMARY OF THE INVENTION

It is, therefore, the primary objective of the present invention to provide a portable hot tub that is easily collapsed and inflated, and that is usable in remote, out-of-the-way locations for taking a bath.

It is an objective of the present invention to provide such a portable hot tub which will heat the water provided therein by solar energy, and which will retain such heat for up to one hour after the cover thereof is removed and the water in the tub is exposed to the ambient air.

It is another objective of the present invention to provide a hot tub that is easily inflated by air, and easily deflated, to allow for ease of transport and storage to the remote site where the hot tub is to be used.

It is another objective of the present invention to provide a hot tub that in connection with a motor will pump air through the water in the tub to create water bubbles, for the comfort of the bather.

It is still another objective of the present invention to allow the cold-water placed in the tub to be heated to approximately 105 degrees F. with seven hours of exposure to direct sunlight, for ambient conditions of approximately 90 degrees F.

Toward these and other ends, the solar-heated hot tub of the invention includes a main body portion made of polyvinylchloride, that is inflatable, which main body portion is in the shape of a bath tub when inflated and has a first, separately-inflatable side rim portion, and a second, separately-inflatable bottom portion joined to lower portions of the side rim portion. The bottom portion is provided with a plurality of hemispherical-shaped, upwardly-extending ribs extending the entire length of the bottom portion, which ribs form a pair of substantially concave-shaped formations upon which may rest two bathers. The first formation includes a pair of outer ribs that project upwardly more than a pair of inner ribs, to thus form the concave shape. The other formation is formed also by a pair of outer ribs, one outer rib being common to both the first and second formations, so that each concave shape substantially takes up half of the width of the bottom portion. The ribs provide not only comfort to the bathers, but also allow for less water to be used to fill up the tub since they project into the water-holding chamber to thus require less water to fill it up, and also provide stiffness and structural integrity to the overall tub. Provided between each longitudinally-extending rib, and running parallel with them, are a plurality of narrow, hollow, perforated sections that when provided with forced air allow for air bubbles to be formed in the water in the chamber for the comfort of the bather. The side rim portion, the bottom portion, and the perforated sections are each inflated separately, so that the same small motor may be used for each, which owing to its small size may be plugged into the cigarette lighter of a vehicle via an adapter. There is also provided a drain in the bottom portion for draining the used water after a bath, which drain is formed with a fitting for connection to a conventional garden hose, so that the free end of the garden hose may be situated distant from the bath site, so that the used bath water may be disposed of at a site distant from a camp, or the like. After draining, the perforated hollow sections may be provided with forced air and the tub inverted, so that the forced air may remove any remaining used water in the tub.

BRIEF DESCRIPTION OF THE DRAWING

The invention will be more readily understood with reference to the accompanying drawing, wherein FIG. 1 is a top view of the solar-heated hot tub of the invention in its fully-inflated, ready-fo-use state;

FIG. 2 is a cross-sectional view taken along line 2—2 of FIG. 1;

FIG. 3 is a cross-sectional view taken along line 3—3 of FIG. 1 and

FIG. 4 is a perspective view of the top cover for the solar heated hot tub of the invention;

DETAILED DESCRIPTION OF THE INVENTION

Referring now to the drawing in greater detail, the solar-heated tub of the invention is indicated generally by reference numeral 10. The tub itself if made preferably of polyvinylchloride, and is hollow so that it may be air-inflated for use, or deflated for storage and transport. The tub is preferably made in two separate sections that are fixedly joined together, as by welding, or the like. This allows for a much smaller motor to be used to inflate the tub, since the capacity requirements are reduced for the motor when the tub is inflated in sections. The possibility of using a smaller motor for inflation means that the motor may itself be plugged into the cigarette lighter of a vehicle, by a conventional adapter, since the requirements for the motor are small enough to admit of a small enough motor capable of being powered by the 12 V D.C. source of the vehicle. If the entire tub were to be inflated all at once, the size of the motor required would be prohibitive for use with the 12 V source. The two sections or portions of the tub are the side rim-portion 12 and the bottom portion 14. The side rim-portion is an upstanding circumferential wall of the tub when inflated, and is preferably 6 feet, 10 inches long when fully inflated. This rim-portion defines the boundary of the inner, water-holding chamber 16, the bottom of which chamber is defined by the bottom portion 14. The width of the side rim-portion is preferably 48 inches. The bottom portion 14 is secured, as by welding, to lower, inner portions of the side rim-portion. The bottom portion is a substantially quadrilateral shaped piece when viewing it from the bottom, and is preferably 36 inches in width and 5 feet, 10 inches in length. The upper surface of the bottom portion is provided with a plurality of longitudinally-extending, parallel ribs which are inflatable along with the rest of the bottom portion. As shown in FIG. 3, there are preferably provided seven such ribs, with the ribs 20, 22 and 24 running the entire length of the bottom piece and having a height substantially greater than the remaining ribs 30, 32, 34, and 36. In the preferred embodiment, each of the ribs 20, 22 and 24 has a width of 8 inches and a height of 6 inches. Each of the ribs 30, 32, 34, and 36 in the preferred embodiment, has a width of 3 inches and a height of 1½ inches. The ribs define a pair of approximate concave-shaped supporting areas upon which a bather is supported. In the preferred embodiment, two such supporting areas are provided so that two bathers may simultaneously take a bath. The first supporting area is defined by the rib 20, 30, 32, and 22, while the second is defined by the ribs 22, 34, 36, and 24. The rib is the center rib and is common to both supporting areas, so that each suppporting area or bottom-support takes up approximately half of the width of the bottom portion of the tub. These plurality of ribs not only define the resting lower supports for the bathers, but also serve two additional functions. They provide stiffness to the bottom portion, thereby enhancing the structural integrity of the tub itself, and also displace water so that the water-holding chamber requires fewer gallons of water to fill it up, thereby saving on water-requirements. The hemispherical shape of each rib helps to increase the amount of water that is displaced.

Each rib is colored black so as to absorb infrared rays from the sun, thereby heating the water in the water-holding chamber 16. Also, the inner wall portions of the side rim-portion may also be colored black for the same reason. A plastic cover lid (not shown) is also provided for closing off the water-holding chamber 16 while the tub is placed in the sun, so that the black surfaces will absorb heat from the sun, and heat the cool water placed in the chamber 16. The clear plastic insulating cover will keep the heat within the chamber 16, while allowing the infrared rays to penetrate therethrough. The cover may be attached to the side rim-portion by any well-known securing means, such as hook-and-pile fasteners.

The side rim-portion 12 is provided with its own air-inflation valve 40, while the bottom portion 14 has its own air-inflation valve 42, which simultaneously fills the ribs with air. A drain plug 46 is also provided in the bottom portion for draining the used water from the tub after the bather has taken a bath. This drain plug preferably has a fitting for attachment to the end of a conventional garden hose, so that the garden hose may deposit the drained water at a location remote from that where the bath tub is used. This is simply accomplished by holding the discharge end of the hose at a lower elevation than the drain plug. The fitting for the drain plug is conventional and well-known.

The hot tub 10 is also provided with hollow, perforated sections 50 extending longitudinally of the bottom portion, and between adjacent ribs along the length of the ribs, as seen in FIG. 1. Each section 50 is a hollow tube approximately ¼ inch in diameter. The perforations of each section 50 face upwardly toward the water-holding chamber 16 for fluid communication therewith, so that as forced air is delivered to the sections 50, air bubbles are formed in the bath water, to provide a well-known therapeutic effect. Each section 50 is connected to a common manifold 52, which in turn is connectable to a source of air via the inlet plug 60. These sections 50 are also visible in FIG. 3, where it is clearly shown how they are placed in the interstices between adjacent ribs. These perforated sections also serve another useful function for removing the last remains of the used bath water from the tub. This is accomplished after the most of the used water has been drained via the drain plug 46, by inverting, or tipping the tub upside-down, and connecting the inlet 60 to the source of air, thereby causing the jets of air to expel the remaining droplets of used water from the tub.

The supply of air for all of the three needs of the tub of the invention, the bottom portion 14, the side-rim portion 12, and the perforated sections 50 comes from one small motor operating a fan-compressor. Since the power requirements of the motor are small enough, owing to the fact that it is used separately for each use, the power requirements sufficient for it may be obtained from 12 V d.c. source of a vehicle, via an adapter for the cigarette lighter thereof. The motor, of course, may be connected to a standard 110 V source.

The total weight of the tub when not in use and not filled with water is approximately 18 to 24 pounds, which makes it quite suitable for easy transport to a camp site, beach, or the like. The tub is preferably made of 30 gauge PVC, with the cover being 10 ml. thick, to magnify the sun's rays, to provide better heating. The basic shape is preferably oblong, though, of course, any shape may be used. The cover also prevents foreign particles from entering into the bath water before the bathers enter it. The cover is also preferably provided with one continuous half of a hook-and-pile fastener, with the other half thereof being attached all around the upper edge surface of the side rim-portion. The half of the hook-and-pile fastener on the side rim-portion may be provided with a flap portion attached at one edge to the side rim-portion itself, which flap portion may be used to cover the half of the hook-and-pile fastener on the tub so as not to cause irritation to the bather. In use, approximately 65 gallons of cool water are needed to fill the tub when two bathers are bathing therein. The water will reach approximately 105 degrees F. after exposure to the sun in about seven hours, and will retain enough heat for over one hour after the cover has been removed and a bath taken by two bathers, such that the water temperature will remain warm enough for the two bathers to bathe therein for over one hour.

While a specific embodiment of the invention has been shown and described, it is to be understood that numerous changes and modifications may be made therein without departing from the scope and spirit of the invention as set out in the appended claims.

What is claimed is:

1. A solar-heated portable hot tub for use in areas where bathing facilities are not available, comprising:
   an inflatable side rim-portion defining the circumferential wall of the hot tub, said side rim-portion having means formed therein for the reception of forced air for inflating said side rim-portion;
   a bottom portion upon which rests a bather when taking a bath in the tub, said bottom portion being joined to lower portions of said side rim portion such that said side rim portion projects upwardly beyond said bottom portion to define therein a water-holding chamber in which a bather takes a bath;

said bottom portion comprising means projecting upwardly and shaped concavely to allow for a bather to be seated therein, said means comprising a first longitudinally extending rib having a substantially convex shape facing upwardly, at least one second longitudinally extending rib having a convex shape facing upwardly less than said first rib, and a third rib similar to said first rib and parallel thereto, said second rib being sandwiched between said first and third ribs to define said substantially concave shape;

said first, second and third ribs being colored black for absorbing heat from the sun for heating water placed in the tub;

an insulating cover for closing off the tub, said cover being substantially clear to allow penetration of the sun's rays and having insulating qualities to keep the heat thereunder;

at least a pair of longitudinally extending sections, each having a series of holes formed therein for allowing air forced therethrough to penetrate into said water-holding chamber to create bubbles;

said first, second and third ribs defining a pair of upper longitudinally extending spaces therebetween at a lower elevation than the upper surface portions of the convex shapes of said ribs, said pair of longitudinally extending sections being mounted in said pair of longitudinally extending spaces such that said series of holes of each said section lies in a plane spaced below the the upper surface portions of the convex shape of said ribs so that a bather does not block the escape of air through said series of holes.

2. The solar-heated tub according to claim 1, wherein said bottom portion further comprises a fourth rib identical to said second rib, and a fifth rib identical to said first and third ribs, said fourth rib being sandwiched between said third and fifth ribs, said third rib being substantially located at the center portion along the width of said bottom portion, whereby two said concave surfaces are provided for two persons to bathe simultanously.

3. The solar-heated tub according to claim 2, wherein said ribs are all inflated simultaneously.

4. The solar-heated tub according to claim 3, wherein said bottom portion further comprises another second rib and another fourth rib so that two said second ribs are sandwiched between said first and third ribs and two said fourth ribs are sandwiched between said third and fifth ribs.

5. The solar-heated tub according to claim 1, wherein said means for supplying forced air to said sections comprises a motor, said motor also supplying forced air to said bottom portion to inflate it and to said side rim portion to inflate it, each of said side rim portion, bottom portion, and said pair of sections being inflated independently of the other and at a different time that does not overlap with the inflation of any other portion, whereby a smaller sized motor may be used for each portion's inflation and where said plurality of sections may be provided with air to force remaining used water from the tub after the tub has been inverted.

6. The solar-heated tub according to claim 1, further comprising means for draining comprising an adapter means for fitting said draining means to one end of a garden hose; and a garden hose having a first end coupled to said means for draining, and a second end remote from said first end for allowing the used water to drain out therefrom.

7. The solar-heated tub according to claim 6, in combination with a motor and air fan for supplying air to said tub, said motor and fan supplying the air to said bottom portion, said side rim-portion, and to said pair of sections independent of each other; and hose means for connecting said motor and fan to said portions and said sections to allow for the passage of air thereto.

* * * * *